US007289907B2

(12) United States Patent
Meinig et al.

(10) Patent No.: US 7,289,907 B2
(45) Date of Patent: Oct. 30, 2007

(54) SYSTEM FOR REPORTING HIGH RESOLUTION OCEAN PRESSURES IN NEAR REALTIME FOR THE PURPOSE OF TSUNAMI MONITORING

(75) Inventors: Christian Meinig, Seattle, WA (US); Scott E. Stalin, Seattle, WA (US); Alex I. Nakamura, Bellevue, WA (US); Hugh B. Milburn, Lake Forest Park, WA (US)

(73) Assignee: The United States of America as Represented by the Secretary of Commerce, Washington, DC (US)

( * ) Notice: Subject to any disclaimer, the term of this patent is extended or adjusted under 35 U.S.C. 154(b) by 24 days.

(21) Appl. No.: 11/133,324

(22) Filed: May 20, 2005

(65) Prior Publication Data

US 2006/0195263 A1 Aug. 31, 2006

Related U.S. Application Data

(60) Provisional application No. 60/656,393, filed on Feb. 28, 2005.

(51) Int. Cl.
*G01W 1/00* (2006.01)
(52) U.S. Cl. .................................. 702/2; 702/3; 702/5
(58) Field of Classification Search .................... 702/2, 702/3, 5
See application file for complete search history.

(56) References Cited

OTHER PUBLICATIONS

"Deep-ocean Assessment and Reporting of Tsunamis (DART)" [online], Mar. 27, 2003, [retrieved on Aug. 21, 2003]. Retrieved from the Internet :<URL: http://web.archive.org/web/20030821074426/http://www.ndbc.noaa.gov/Dart/dart.shtml>.*
Milburn et al., "Deep-ocean Assessment and Reporting of Tsunamis (DART); Real-Time Tsunami Reporting from the Deep Ocean" [online], Mar. 27, 2003, [retrieved on Sep. 16, 2003]. Retrieved from the Internet :<URL: http://web.archive.org/web/20030916051802/www.ndbc.noaa.gov/Dart/milburn_1996.shtml>.*
EQ (Earthquake Wuarterly), Published by the Western States Seismic Policy Council, Summer 2003, pp. 1-20.*
Milburn, et al., "Real-Time Tsunami Reporting From the Deep Ocean", OCEANS '96, MTS?IEEE, Prospects for the 21st Century, Conference Proceedings, vol. 1, Sep. 23-26, 1996, pp. 390-394.*
Tsunameter Network "Deep-Ocean Assessment and Reporting of Tsunamis" Background http://www.pmel.noaa.gov/tsunami/Dart/dart_pbl.html pp. 1-2, no date supplied.

(Continued)

*Primary Examiner*—Donald E McElheny, Jr.
(74) *Attorney, Agent, or Firm*—Stevens, Davis, Miller & Mosher LLP

(57) ABSTRACT

This invention is the NOAA Deep ocean Assessment and Reporting of Tsunami (DART) system, which utilizes a seafloor tsunameter linked to an ocean surface buoy via bi-directional communication system for near real-time measurement and reporting of tsunamis. The buoy is equipped with a bi-directional satellite and acoustic modem communication system for transmitting data between remote locations, such as tsunami warning centers and the tsunameter on the seafloor.

16 Claims, 1 Drawing Sheet

OTHER PUBLICATIONS

F.I. Gonzalez1, H.B. Milburn 1, E.N. Bernard1, J. Newman2, "Deep-ocean Assessment and Reporting of Tsunamis" (DART): Brief Overview and Status Report; pp. 1-12, no date supplied.

Dr. Eddie Bernard "Broadband Vibrating Quartz Pressure Sensors for Tsunameter and Other Oceanographic Applications" Mustafa Yilmazl and Paul Migliacio; Paroscientific, Inc. Redmond, WA USA; pp. 1-7, no date supplied.

B.Taft1, C.Meinig2, L.Bernard1,C Teng1, S.Stalin2, K.O'Neill, M.Eble2, C.Demers1; Transition of the Deep-ocean Assessment and Reporting of Tsunamis Network—A Technology Transfer from NOAA Research to NOAA Operations pp. 2582-2588, no date supplied.

* cited by examiner

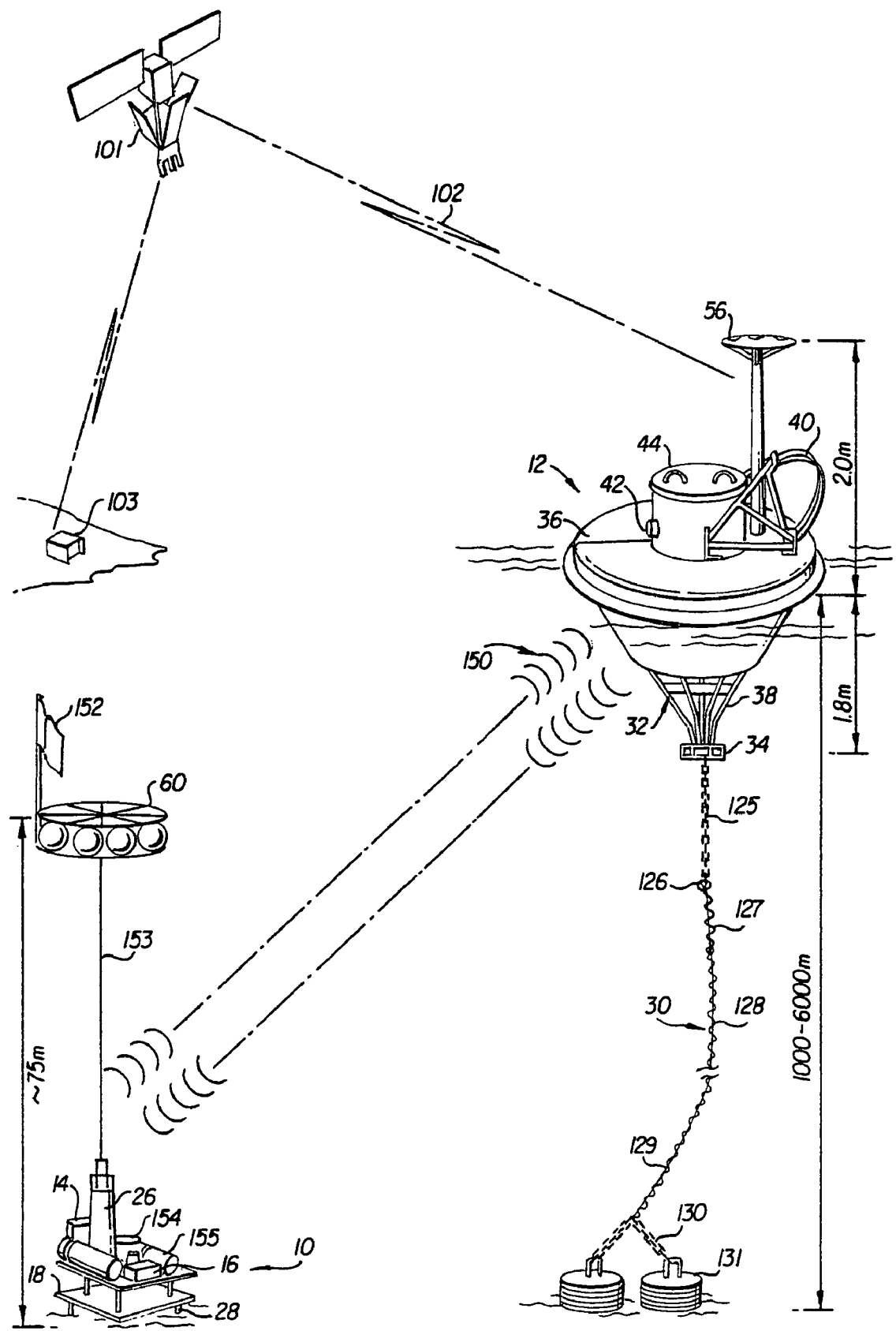

SYSTEM FOR REPORTING HIGH RESOLUTION OCEAN PRESSURES IN NEAR REALTIME FOR THE PURPOSE OF TSUNAMI MONITORING

CROSS REFERENCE TO RELATED APPLICATIONS

This application claims priority from U.S. Provisional Application No. 60/656,393, filed Feb. 28, 2005, herein incorporated by reference in its entirety.

BACKGROUND OF THE INVENTION

1. Field of the Invention

This invention concerns portable moored systems for near real-time detection of tsunamis in the deep ocean environment. Measurement and reporting of tsunamis in the deep ocean with this invention provides data free from coastal effects that is essential for accurate forecasting of tsunami impacts and in time to evacuate coastal residential areas. Additional applications of this invention include tsunami model verification, satellite altimetry validation and calibration; seafloor inflation or deflation measurement, for example, subsea volcano monitoring or monitoring of subsea oil and gas fields.

2. Background

The mission of the Pacific Marine Environmental Laboratory (PMEL), Seattle, Wash., (www.pmel.noaa.gov) is to conduct interdisciplinary scientific investigations in oceanography and atmospheric science. The Laboratory's strength lies in the experience and knowledge of its scientific and engineering staff and their ability to obtain, process, analyze, and distribute high-quality oceanographic measurements. Current programs focus on open ocean observations in support of long-term monitoring and prediction of the ocean environment on time scales from seconds to decades. Studies are conducted to improve our understanding of the complex physical and geochemical processes operating in the world oceans, to define the forcing functions and the processes driving ocean circulation and the global climate system, and to improve environmental forecasting capabilities and other supporting services for marine commerce and fisheries. Results from PMEL research activities contribute to National Oceanic and Atmospheric Administration (NOAA) strategic goals of implementing seasonal-to-interannual climate forecasts, assessing and predicting decadal to centennial climate change, advancing short-term warning and forecast services, and building sustainable fisheries. Major programs include:

1. TAO Project—Real-time data from moored ocean buoys for improved detection, understanding and prediction of El Nino and La Nina.
2. FOCI Program—(Fisheries-Oceanography Coordinated Investigations)—a joint research program of NOAA's National Marine Fisheries Service to understand the recruitment of Walleye Pollock in the Gulf of Alaska and Bering Sea.
3. VENTS Program—Conducts research on the impacts and consequences of submarine volcanoes and hydrothermal venting on the global ocean.
4. Tsunami Program—seeks to mitigate tsunami hazards to Hawaii, California, Oregon, Washington and Alaska. Research and development activities focus on an integrated approach to improving tsunami warning and mitigation.

The invention uses a tsunameter on the seafloor that precisely measures the pressure over time in the deep ocean. One application of a tsunameter is to measure ocean pressure for detecting the presence or absence of a tsunami. Just as seismometers have been essential to progress in the field of earthquake research, a tsunameter is critical to the further advancement of tsunami research and hazard mitigation and warning. NOAA-PMEL has developed a reliable tsunameter and successfully integrated that capability into a moored system now known as DART (Deep Ocean Assessment and Reporting of Tsunamis). An operational network, though currently small, has been established in the Pacific Ocean. DART is a powerful catalyst for the revolutionary paradigm shift now underway in tsunami research and forecasting—away from indirect observations and toward direct, high-quality measurements and analyses of the tsunami itself. Elements of the DART system can be deployed in several configurations. In stand-alone configuration, the tsunameter internally records pressure data on the seafloor for later analysis. In realtime configuration the tsunameter communicates to a surface buoy via an acoustic modem. The surface buoy then relays the data thru a satellite to shore station for near real time communications. The tsunameter could also be connected to a cable for realtime bi-directional communications.

Until now tsunami research and operational decisions of Tsunami Warning Centers have depended primarily on analyses of seismic information and coastal tide gage measurement. Though valuable, these data are essentially indirect and their interpretation is difficult. Seismic data interpretation involves poorly understood seismic/hydrodynamic coupling. Similarly, the interpretation of tide gage data is difficult because of the complex tsunami transformations induced by interaction with continental shelf, coastline, and harbor features. Furthermore, a tide gage may not survive the impact of the tsunami itself and, if it does survive, the data are not reported until after the tsunami strikes a coastal community.

Engineering advances at NOAA's PMEL have led to the development of a system that acquires and delivers direct tsunami measurements at deep ocean locations between the source and distant communities, and transmits these data in real time to tsunami warning centers and the Internet.

SUMMARY OF THE INVENTION

The Deep-ocean Assessment and Reporting of Tsunamis (DART) system was developed in support of the National Tsunami Hazard Mitigation Program (NTHMP). The primary goal of the system is to reduce the loss of life and property resulting from tsunami inundation. A secondary goal of the system is to eliminate false alarms, which potentially cost millions of dollars in lost revenue, endanger lives, and erode the credibility of the warning network.

The DART system was developed and tested as a prototype in 1995 by the NOAA Pacific Marine Environmental Laboratory (PMEL). Currently, the network is in an operational configuration and has expanded to an array of six stations. This includes three DART stations south of the Aleutian Islands, two off the United States Oregon and Washington coasts, and one equatorial station.

Operational responsibility for the DART system has been transferred from a research laboratory (PMEL) to the appropriate operational center National Data Buoy Center (NDBC) because the system is robust, reliable, and cost-effective. PMEL will continue to provide engineering support as needed and will continue with development of future generation DART systems to take advantage of technological advancements. NDBC will be responsible for system troubleshooting, routine maintenance, documentation, testing, deployment procedures, and data quality control, display and dissemination to the public. The partnership of NDBC and PMEL is committed to ensuring the long-term success of the DART system.

Development of an operational tsunameter was an extraordinary engineering accomplishment. The task was to design, develop, test, and deploy real-time reporting, deep-ocean instrumentation capable of surviving a hostile ocean environment while performing with the quality and reliability demanded of an operational tsunami warning system on which so many lives depend. The PMEL invention described here meets this challenge, with the primary requirements listed in Table 1 as goals that would guide the design. No such system had ever been developed until the successful effort of the NOAA/PMEL Engineering Development Division.

TABLE 1

| | |
|---|---|
| Reliability and data return: | >80% |
| Maximum deployment depth: | 6000 m |
| Minimum deployment duration: | >1 year |
| Survivability: | Survive N. Pacific winters |
| Maintenance interval | >2 year buoy >4 years tsunameter |
| Sampling interval, internal record: | $\leq$15 sec |
| Sampling interval, event reports: | 15 and 60 sec |
| Sampling interval, tidal reports: | 15 min |
| Measurement sensitivity: | <1 mm in 6000 m; $2 \times 10^{-7}$ |
| Tsunami data report trigger | Automatically by tsunami detection algorithm On-demand, by warning center request |
| Reporting delay: | <3 min |
| Maximum status report interval: | <6 hours |

The components of a tsunameter are mounted in water tight housings on a platform that is located on the seafloor. The system components include 1) an embedded computer including printed circuit boards for data input/output, data storage and an algorithm for detecting tsunamis, 2) precision frequency counting circuit, 3) an acoustic modem and transducer for realtime control and communication, 4) a Digiquartz® broadband pressure sensor, 4) a tilt sensor to determine platform tilt and 5) batteries for power.

Although conventional systems employ tsunameters as used herein, the present invention permits real-time, or near real-time, two-way communication between the tsunameter on the sea floor and a remote station, which may be thousands of miles away. Through this bi-directional communication system, the configuration and other information relied upon by the tsunameter can be changed or replaced remotely without the need to physically recover the tsunameter from depths of up to six kilometers.

BRIEF DESCRIPTION OF THE DRAWINGS

The embodiments, features and advantages of the invention described herein will occur to those skilled in the art from the following description of a preferred embodiment and the accompanying drawing, in which:

The Figure shows a typical mooring system used in accordance with the invention.

DETAILED DESCRIPTION OF THE INVENTION

Each DART station is comprised of a tsunameter 10 and a surface buoy 12. The tsunameter 10 typically measures and records the pressure of the overlying water column using a pressure sensor 16 such as a Paroscientific model 410K-017 Digiquartz® pressure transducer, available from Paroscientific of Redmond, Wash. and a PMEL designed counting circuit. A tsunami detection algorithm developed by PMEL compares real-time measured pressure values to those expected. Data are converted from pressure to seawater height in millimeters and are then relayed to the surface buoy 12 via, for example, a wireless acoustic modem, such as the Benthos ATM-880 acoustic modem available from Benthos of Falmouth, Mass. The DART system is capable of measuring tsunamis as small as 1 cm in height with a resolution of $\leq$1 mm and reporting the data in near real time.

A pressure sensor 16 is the main sensing element in the bottom pressure recorder. This sensor and associated circuit board monitors pressure continuously and, if the pressure reading changes above a set threshold, then the tsunameter automatically transmits data to a surface buoy. The surface buoy 12 makes a satellite connection to tsunami warning centers that evaluate the threat and, if necessary, issue a tsunami warning.

The most important sensing requirement is the detection of very small pressure changes at water depths up to 6000 meters. The change in water depth due to a tsunami in the open ocean can be as small as one centimeter. The resolution capability of depth sensor and associated circuit board make it possible for tsunameters to detect water level changes of less than one millimeter at the deployed depth of 6,000 meters (one part in six million), but is designed to function at any depth between 1000 and 6000 meters.

The depth sensors employ a Bourdon tube as the pressure-to-load generator. Pressure applied to a Bourdon tube generates an uncoiling force which applies tension to the quartz crystal. A change in frequency of the quartz crystal oscillator is a measure of the applied pressure. The output frequency of a temperature sensitive crystal is used for thermal compensation. The mechanical components are acceleration compensated with balance weights to reduce the effects of shock and vibration. The transducers are hermetically sealed and evacuated to eliminate air damping and maximize the Q of the resonators. The internal vacuum also serves as an absolute pressure reference.

The high performance of the depth sensor is achieved through the use of a precision quartz crystal resonator whose frequency of oscillation varies with pressure induced stress. Quartz crystals were chosen for the sensing elements because of their remarkable repeatability, low hysteresis, and excellent stability. The resonant frequency outputs are maintained with oscillator electronics similar to those used in precision clocks.

The quartz crystal consists of two identical beams driven piezoelectrically in 180° phase opposition such that very little energy is transmitted to the mounting pads. The high Q resonant frequency, like that of a violin string, is a function of the applied load; increasing with tension and decreasing with compressive forces. The temperature sensor consists of piezoelectrically-driven, torsionally oscillating tines whose resonant frequency is a function of temperature. Its output is used to thermally compensate the calculated pressure and achieve high accuracy over a wide range of temperatures.

Typical rms noise levels for Digiquartz® pressure transducers are known. For records shorter than about 1 hour, is less than 1 part per million. The rms noise increases for longer data records because of sensor drift and because temperature and other environmental contributors to noise tend to vary more over a longer period of time. The rms noise rises slowly with record length, reaching approximately 10 ppm for records of several years.

The system of the invention utilizes a bi-directional system to allow real-time communication between the tsunameter and a remote monitoring station. The preferred embodiment, as described herein, communicates through a communication means, such as an acoustic modem with the surface buoy. The surface buoy, in-turn, acts as a gateway, forwarding messages from the remote station to and from the tsunameter. Preferably, the surface buoy receives and transmits data to and from a satellite or satellite system 101, such the Iridium satellite system operated by Iridium Satellite LLC of Leesburg, Va. Such communications may be a bi-directional communication and control 102 to facilitate communication between the buoy 12 and a ground-based tsunami warning center 103. By communicating with a relatively low altitude satellite, power requirements on the surface buoy can be as little as 1 W. However, if communication with a satellite in a much higher altitude, such as one in geosynchronous orbit, higher power levels are required. If the distance is not too great, radio frequency telemetry can be used. It is also possible to eliminate the satellite portion of the system, by linking the surface buoy directly to the remote station by, for example, cable. Additionally, it is considered within the scope of the invention, to utilize a network of ships which are in constant communication (such as a navy), such that one or more is close enough to communicate with the buoy and/or tsunameter. In such a naval-based communication system, communications to/from the tsunameter can be relayed to a remote location using one or more ocean vessels which are close enough to communicate directly with the tsunameter (optionally through the surface buoy).

Additionally, if a cable is used to provide communication between the tsunameter and a remote station (which may function to provide communication directly between the tsunameter and other remote stations), it is possible to eliminate the surface buoy completely.

Moreover, although the system is designed to provide communication between the tsunameter and the buoy through an acoustic modem, as described herein, such communication is not so limited. For example, messages may be sent by any other communication means, such as a physical link (e.g., cable), infrared, radio frequency, magnetic, or even modulation of light.

Although most tsunamis are caused by earthquakes or other seismic events in the ocean, the tsunameter of the invention is capable of monitoring for the result of, not only one cause of tsunamis. Other known causes of tsunamis include landslides which may occur above and below the water, and meteors. As the system of the invention measures the resulting change in water depth, the cause of the tsunami is irrelevant.

During normal operation, the tsunameter continually samples and processes the pressure measurements at the seafloor. These measurements are then preferably stored into four 15 minute blocks per hour, which are an accurate representation of the tidal change at the station. These values along with system engineering parameters are transmitted several times per day to the surface buoy. Two consecutive deviations in height from a tidal prediction algorithm running on the embedded computer cause the system to trip into event reporting mode. During this mode, the pressure measurement averaging period is decreased and the reporting frequency is increased. These reports are transmitted without delay to the buoy.

Each bi-directional Deep-ocean Assessment and Reporting of Tsunamis (DART) system is designed to detect and report tsunamis on its own, without instructions from land. However, because of the bi-directional features of this system, the tsunami warning centers may choose to place any specific station(s) in event mode to aid tsunami forecasting. An algorithm running in the tsunameter generates predicted water height values and compares those height values to a measured value. The tides and lower frequency signals are predicted within a few millimeters using a cubic polynomial that is fit to bottom pressure observations over the past three hours. If the comparison of predicted and measured water heights exceeds a preset threshold, the tsunameter triggers into event mode. The predictions and measurements are updated every 15 seconds, which is the nominal sampling interval of the tsunameters.

Background oceanic noise determines the minimum detection threshold. Based on past observations, a reasonable threshold for the North Pacific is 3-4 cm. If the amplitudes exceed the threshold, the tsunameter goes into the event mode to provide detailed information about the tsunami. It remains in this mode for at least four hours.

All event mode data are transmitted via a simple data compression scheme. The first data value is the full water column height in mm of sea water. The following values are signed, 16 bit numbers representing departures from the full values in mm of sea water height.

The compression scheme allows for reporting of an event, even when the data fails to be completely transmitted and/or received. If, for example, the data includes the existence of an event (as a first part of the message) and the conditions observed with the event (in a second part of the message), the two-way communication system allows for remote poling of the system should only the first part of the message be received. In other words, if the presence of an event is reported, but the data associated with the event is not completely received, for any reason, the user can request that the tsunameter repeat the message immediately. Alternatively, the system can be designed/configured such that when a message is received by a remote location, a receipt confirmation message is transmitted back to the tsunameter. When the receipt confirmation message is not received, the tsunameter can automatically repeat the entire "event message."

The system of this invention permits a great deal of changes to the system configuration which was not possible through the conventional systems. For example, if the system were to report a false alarm, i.e., an "event" that did not result in a tsunami, it may be necessary to alter the thresholds used to determine the existence of an "event." Thus, by permitting real-time reprogramming of the parameters of the tsunameter, the invention permits quick adjustment of the configuration without incurring great costs.

The tsunameter platform is comprised of a mounting platform 18, acoustic transducer 14, electronics canister 20 (not shown), battery canisters 22 (not shown), pressure transducer 24 (not shown), acoustic release 26, mooring and anchor 28. The system is powered with batteries, typically alkaline batteries, to allow for a unattended deployment, for up to 4 years or more, with a planned activity of up to 20 tsunami events per year.

The mounting platform is latched onto a disposable anchor 28 via a hard mounted acoustic release. The acoustic release is attached to a subsurface mooring consisting of glass ball floatation 60 and mooring line. In response to a remote command, typically transmitted via an acoustic transducer, the acoustic release 26, causes the tsunameter 10 to detach from the anchor 28. The glass ball floatation 60 causes the tsunameter 10 to float to the surface, allowing for retrieval of the tsunameter 10. The platform may include a 13 mm polyester line 153, as well as a CPU 154 and batteries 155. The platform can communicate with the buoy 12 via bi-directional acoustic telemetry 150.

The purpose of the surface buoy 12 is to provide a bi-directional communications link from the tsunameter to the tsunami warning centers. The buoy acts as a gateway by receiving acoustic messages from the tsunameter using redundant system electronics on the buoy and sending the pressure values and engineering data to shore via a satellite system, such as Iridium. The buoy engineering data consists of parameters related to the quality of the acoustic modem transmission including number of attempts to transmit the data and battery status. Such data can be sent to a remote computer in less than three minutes.

The 2.5 m diameter buoy is constructed of a foam filled fiberglass shell 36 with an internal stainless steel frame. It has a stainless steel bridle 38, superstructure with lifting handle 40 and electronics well 42. Each buoy 12 houses a complete redundant system to boost overall system reliability, which is expected to achieve data reception reliability rate of over 80%. Each buoy electronic system typically includes a GPS receiver and satellite transmitter 44, internal processor for formatting data messages 46 (not shown), acoustic modem 52 (not shown), acoustic transducer 32 and a power distribution system 52 (not shown). The power system of the buoy is comprised of eight battery assemblies which consist of assemblies of standard D-cell alkaline batteries. The battery capacity is designed to power the buoy for 2 years with approximately 20 tsunami events per year. Each buoy may be equipped with a short range RF modem 50 (not shown) that allows field engineers to monitor the system immediately following deployment, which can be used in combination with, or in lieu of the bi-directional satellite communication system. An anchor 131 can include a mass of 3100 kg, connected to the remainder of the buoy 12 by a, e.g., 5 m long 13 mm chain 130.

Alkaline batteries are preferably used to power the tsunameter because they are inexpensive and reliable, but other forms of power could be used. Alternatives may include, but are not limited to, lithium cells, nickel metal hydride cells, lead acid batteries, fuel cells, or seawater batteries. Although alkaline batteries are preferred, the power source is not so limited. For example, because the water is constantly moving across the tsunameter on the sea floor, although the actual rate of movement may be small, it is possible to provide the tsunameter with an apparatus for recharging the batteries using the ocean movement.

Other optional sensors may be positioned on or in the sensor mast 56 on the buoy bridle 38 or on the mooring line 30. Such sensors may include a wide selection of oceanic and meteorological sensors such as anemometer, compass, sea surface temperature and conductivity sensor, barometer and relative humidity sensor, or any other oceanic or atmospheric sensor.

An example of a typical mooring 12 for a DART system is shown in the figure. The surface buoy 12 uses a 2.5 m diameter fiberglass over foam disk buoy with a gross displacement of 4000 kg. The mooring line 30 consists of chain. e.g. 25 mm chain 125, and 8-strand plaited nylon line (e.g., 25 mm nylon 127, 19 mm nylon 129, and 22 mm nylon 128 which maybe connected with a swivel 126) with a rated breaking strength of 7100 kgf and is deployed with a scope of 0.985. This design maintains a watch circle that keeps the buoy positioned within the range of the acoustic transmission. Two downward looking transducers 32 are mounted on the buoy bridle at a depth of 1.5 m below the sea surface. A multi-layered baffle system 34 of steel, lead, and syntactic foam shields the transducers and cushions them with rubber pads for a soft mount.

The entire system, as described herein, is designed to last for an extended period of time. For example, the surface buoy 12 and tsunameter have endurances as long as 2 and 4 years, respectively, using reliable and low-cost alkaline batteries. The tsunameter consumes less than 30 mW of power (not including acoustic communications) to detect tsunamis. The ultra-low-power design enables the tsunameter to be deployed for 4 years without a complex, expensive or large power source. The benefits of this design increase tsunameter endurance and robustness, thereby reducing expensive at sea servicing. Although alkaline batteries are preferred, the power source is not so limited.

The DART bi-directional communication system allows for transfer or critical parameters. Such parameters include remote trip of the tsunameter, remote set of the tripping threshold (typically 3-9 cm, but can be any value), remote re-boot of the system, and remote requesting of archived data (over a period as short as 15 seconds or several hours or days), as well as engineering setup parameters and acoustic modem parameters.

When there is no acoustic message received from the tsunameter during the course of an hour, the buoy transmits an alternative message indicating its GPS position. This data can be used to troubleshoot if the watch circle of the buoy has drifted outside the transmission range of the tsunameter acoustic modem.

The bi-directional DART system has two data reporting modes, 'standard' and 'event' mode. The system operates routinely in standard mode, in which four 15-minute average values of sea surface height are reported at a scheduled transmission time for the purposes of quality control. When the tsunami detection algorithm identifies an event, the system ceases standard mode reporting and begins 'event mode' transmissions. In event mode, 15-second values are transmitted during the initial few minutes, followed by 1-minute averages. The system returns to standard mode after several hours if no further events are detected. In additional to the reporting mode several system parameters can be changed remotely thru the use of bi-directional communications link.

Realtime tsunameter data is critical to producing an accurate tsunami model and subsequent site and event specific forecast because tsunami signal recorded by tsunameters is not contaminated by local coastal effect and the tsunameter has a very constant frequency response in the tsunami frequency range. Since most tide gauges are designed to measure tides, they often do not perform well in the tsunami frequency band and cannot be ingested into models with the same confidence as deep ocean tsunameter data.

We claim:

1. A system for monitoring for tsunamis comprising:
   a tsunameter for reporting ocean pressures comprising a bottom pressure recording (BPR) system to be positioned on a seafloor;
   a surface buoy connected to said tsunameter by a link; and
   a bi-directional relay system, wherein said bi-directional relay system communicates with external sources other than the surface buoy to transmit data to and from said tsunameter.

2. The system of claim 1, wherein said link is an acoustical link.

3. The system of claim 1, wherein said bi-directional system comprises a satellite communication system.

4. The system of claim 1, wherein said data comprises instructions to change parameters of said tsunameter.

5. The system of claim 4, wherein said parameters comprise at least one selected from the group consisting of standard mode and event mode.

6. The system of claim 1, wherein said tsunameter comprises:
   a depth sensor;
   a computer;
   a precision frequency counting circuit
   a data storage device; and
   means for communicating with said surface buoy.

7. The system of claim 6, wherein said communicating means comprises an acoustic modem and transducer.

8. A method for operating a system for reporting ocean pressures comprising:
   monitoring ocean pressure information with a device located on the seafloor in an ocean environment;
   transmitting said pressure information to a remote location; and
   transmitting data from said remote location to said device to configure and control the device without removing the device from the seafloor.

9. The method of claim 8, where said transmitting data step comprises:
   sending said transmitted data to a surface buoy, and transmitting said data from said surface buoy to the device located on the seafloor.

10. The method of claim 8, wherein said transmitting said data from said remote location comprises utilizing a satellite.

11. The method of claim 8, wherein said monitoring comprises collecting said pressure information with a tsunameter, and further comprising adjusting parameters of tsunameter based on said transmitted data.

12. The method of claim 11, wherein said parameters are selected from the group consisting of standard mode and event mode.

13. The method of claim 8, wherein said monitoring step comprises detecting pressure changes at water depths of up to 6000 m.

14. The method of claim 13, wherein said transmitting step is performed when said pressure changes indicate a water level change exceeding a preset threshold.

15. The method of claim 14, wherein the preset threshold is between 1 and 9 cm.

16. The method of claim 8, wherein:
   said monitoring step comprises:
      continually sampling pressure measurements from a seafloor; and
      storing said measurements into four 15 minute blocks, representing tide levels; and
   said transmitting step comprises:
      periodically sending said stored measurements, and system engineering parameters via an acoustic modem.

* * * * *